Nov. 8, 1966    E. G. BALCENIK ETAL    3,283,616
METHOD OF MAKING SPINNERETTES
Filed May 4, 1964

INVENTORS
Edward G. Balcenik
BY Fred E. Roth

John S. [signature]
AGENT

United States Patent Office 3,283,616
Patented Nov. 8, 1966

3,283,616
METHOD OF MAKING SPINNERETTES
Edward G. Balcenik, Bernardsville, and Fred E. Roth, Florham Park, N.J., assignors to Engelhard Industries, Inc., Newark, N.J., a corporation of Delaware
Filed May 4, 1964, Ser. No. 364,519
5 Claims. (Cl. 76—107)

The present invention deals with a method of making spinnerettes and more particularly with a method of making spinnerettes having capillary lengths maintained extremely uniform in the reproduction thereof.

It has been established that the uniformity of yarn composed of extruded synthetic filaments is dependent in part, and among other factors, on the uniformity of spinnerette capillary lengths. Under precision conditions it has been possible to maintain capillary lengths substantially uniform within tolerances of about ±0.001″ to about ±0.002″. However, even so, in the striving for greater uniformity of yarn, the above-mentioned tolerances represent hurdles still to be overcome in the desire for still greater precision in capillary length uniformity and the consequent greater uniformity of yarn.

In accordance with this invention, it has been recognized that non-uniformity in the reproduction of spinnerette capillary lengths is detrimental to the production of uniform deniers. Consequently, the invention contemplates the fabrication of composite spinnerettes wherein capillary bores are formed through an extrusion plate ground or lapped to precise thickness which is subsequently welded to an appropriately counterbored inlet plate to provide a composite spinnerette of requisite thickness, the welding being accomplished without plastic deformation or dimensional change in the component plates.

It is an object of the invention to provide a method of making a spinnerette having capillary lengths of greater uniformity in the reproduction thereof.

It is the object of the invention to provide a method of making spinnerettes wherein the spinnerette capillary lengths are maintained within tolerances of ±0.0001″.

Figure 2:
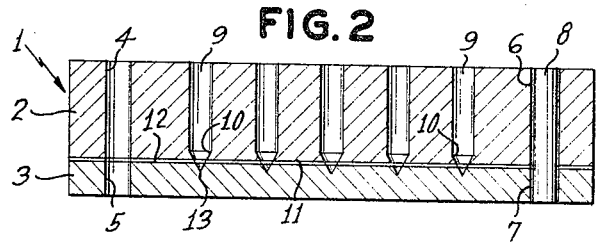
Figure 1:
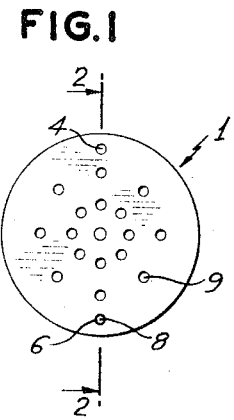

Other objects of the invention will become apparent from the description hereinafter following and the drawings forming a part hereof, in which:

FIGURE 1 is an exaggerated top view showing an early phase assembly in the manufacture of a spinnerette according to the invention, FIGURE 2 is an enlarged cross-sectional view along lines 2—2 of FIGURE 1.

Figure 3:
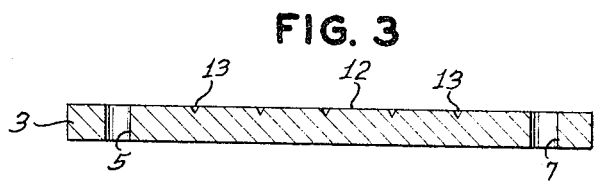
Figure 4:
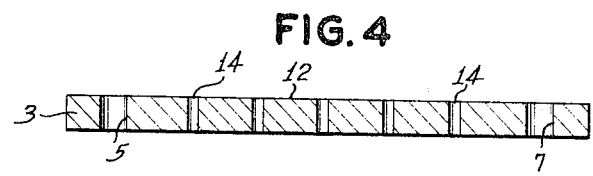
Figure 5:
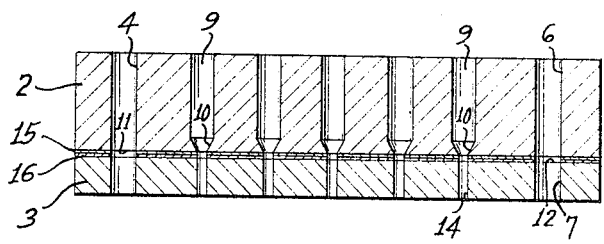
Figure 6:
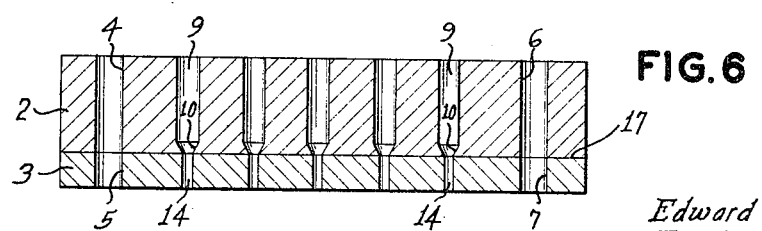

FIGURE 3 is a cross-sectional view of a removed bottom plate component of the assembly of FIGURE 1, FIGURE 4 is a cross-sectional view showing as an intermediate phase the provision of capillary bores through the bottom plate of FIGURE 3, FIGURE 5 shows a cross-sectional view of a spinnerette assembly for the welding of the component plates in accordance with the invention, and FIGURE 6 shows a cross-sectional view of the finished spinnerette.

Referring to the FIGURES 1 through 4 a circular or platelike composite spinnerette 1 having, for example, a steel plate having a diameter of about 3½″ is provided by positioning preferably clamping an upper circular blank 2 having a thickness of from about 0.062″ to about 1.0″ and smoothened faces on a lower circular blank 3, for example a steel blank, of corresponding diameter having smoothened faces and a thickness of from about 0.007″ to about 0.250″, and forming a plurality of co-axial bores 4 and 5 and co-axial bores 6 and 7 through the upper and lower blanks adjacent their marginal peripheral regions. Prior to the combining of the plates by clamping, at least one face of the upper blank 2 and both faces of the lower blank 3 are ground and lapped to precision thicknesses. The initial smoothening or grinding and lapping of plate 3 is critical in consideration of the assurance that the capillary lengths subsequently formed are of controlled and uniform length, the bottom plate being so ground and lapped to a prescribed thickness within ±0.0001″. Dowel pins are then force-fitted into the plurality of co-axial bores of both blanks in the manner illustrated by the dowel 8 fitted into bores 6 and 7. Having mechanically secured the blanks or plates in such manner with smoothened faces in mating engagement adjacent each other, a plurality of cylindrical conically terminated counterbores 9 are formed through the upper surface of the plate 2 with the conical terminal portion 10 passing through the bottom face 11 of the upper plate and providing for the scoring of the upper surface 12 of lower plate 3 to provide center guide means 13 indicating the location of the axis of a cylindrical counterbore 9. The dowels are removed, the plates are separated, and with the score means as a guide, cylindrical capillary bores 14 having a diameter of from about 0.005″ to about 0.062″ are formed through the thickness of the bottom plate 3 as shown in FIGURE 4, each, when the plates are reassembled, being in axial alignment with its cooperating cylindrical counterbore in upper plate 2.

Thereafter, mating faces of the plates 2 and 3, i.e. bottom face 11 of plate 1 and upper face 12 of plate 3, are plated to a desirable thin film thickness of from about 1 molecule to 20 molecules thickness of an oxidization resistant metal such as platinum, rhodium, gold or nickel. The extremely thin film 15 and 16 of the oxidation resistant metal, exaggerated in thickness as illustrated by FIGURE 5, do not deleteriously affect the spinnerette orifices. Preferably, the plating is accomplished by appropriately positioning the plates in a vacuum plating apparatus and the faces are plated by vapor deposition of the oxidation resistant metal, for example, under $1 \times 10^{-5}$ mm. Hg vacuum according to conventional procedure.

Having plated the mating faces of the plate, the plates 2 and 3, as illustrated by FIGURE 5, are again re-assembled with the plated faces adjacent each other and with the capillaries 14 in co-axial alignment with the counterbores 9 with or without the application of the dowel pins 8. The plates 2 and 3 are secured together under pressure, e.g. by clamping to exert opposing pressure at the mated surface interface. While the plated mating surfaces 11 and 12 illustrated in FIGURE 5 are shown in spaced relationship, such spacing in the illustration is exaggerated merely because of the exaggerated showing of the plated film thickness. Due to the extremely thin plating of molecular thickness, the faces 11 and 12 are in fact not measurably separated especially when combined under clamping forces. With the plates 2 and 3 secured as described above, the composite plate-like spinnerette is fired, preferably under non-oxidizing conditions, to a temperature of from about 800° C. to 1300° C. for from about 5 minutes to about 1 hour, depending upon the oxidization-resistant metal employed, until essentially all the bonding oxidization-resistant metal is diffused in situ in the substrate metal of the plates 2 and 3, and the plates are effectively welded together without plastic deformation or dimensional change and in the structural relationship illustrated by FIGURE 6. In view of the initial molecular thickness of the interface film which is completely diffused into the substrate metal by solid diffusion, the resultant bond is a substrate-to-substrate bond without a definable interface so that the initially composite spinnerette becomes a substantially uniform solid structure of substantially uniform composition when the preformed plates 2 and 3 are composed of identical metal composition. Consequently, the interface 17, illustrated by FIGURE 6, is merely illustrative in the showing of the relative alignment of the counterbores and capillaries and the precision uniformity of the critical capillary lengths.

Generally, the invention comprises the method of making a spinnerette comprising positioning a face of a first metal plate in mating engagement adjacent a face of a second metal plate, mechanically securing the plates in contiguous relationship, forming a perpendicular counterbore having a conical terminal into the first plate with the terminal extending into and securing the surface of the second plate, separating the plates and forming a perpendicular cylindrical capillary bore through the second plate with its axis passing through the score, plating a thin film of an oxidation-resistant metal on the mating surface of at least one substrate metal plate, re-assembling the plates witth the plated face therebetween and the capillary bore in co-axial alignment with the counterbore, securing the plates in combined contiguous relationship and heating the combined plates until the oxidation-resistant metal is substantially completely diffused into the plates by solid diffusion.

While the invention has been described with the substrates or plates composed of steel, other substrate metal compositions are contemplated with the initial component plates being composed of identical or different metal compositions relative to each other.

Various modifications of the invention are contemplated within the scope of the appended claims.

What is claimed is:

1. The method of making a spinnerette comprising positioning a face of a first metal plate in mating engagement adjacent a face of a second metal plate, mechanically securing the plates in contiguous relationship, forming a perpendicular counterbore having a conical terminal into the first plate with the terminal extending into and scoring the surface of the second plate, separating the plates and forming a perpendicular cylindrical capillary bore through the second plate with its axis passing through the score, plating a thin film of an oxidation-resistant metal on the mating surface of at least one substrate metal plate, re-assembling the plates with the plated face therebetween and the capillary bore in co-axial alignment with the counterbore, securing the plates in combined contiguous relationship and heating the combined plates until the oxidation-resistant metal is substantially completely diffused into the plates by solid diffusion.

2. The method of making a spinnerette according to claim 1, comprising plating a thin film of oxidation-resistant metal on the mating surfaces of the plates.

3. The method of making a spinnerette according to claim 1, wherein the first and second plates are composed of identical metal, heating the combined plates until the oxidation-resistant metal is substantially completely diffused in the substrate metal by solid diffusion and the mating surfaces are bonded by a substrate-to-substrate bond.

4. The method of making a spinnerette according to claim 1, comprising heating the combined plates at from about 800° C. to about 1300° C. until essentially all the oxidation-resistant metal is diffused into the plates by solid diffusion.

5. The method of making a spinnerette according to claim 1, wherein the first and second plates are of different metal composition relative to each other.

No references cited.

GRANVILLE Y. CUSTER, JR., *Primary Examiner.*